United States Patent [19]

D'Ambro et al.

[11] Patent Number: 4,569,280

[45] Date of Patent: Feb. 11, 1986

[54] PRODUCE WEDGER

[75] Inventors: Dominic D'Ambro; Clayton E. Giangiulio, both of Malvern, Pa.

[73] Assignee: Le-Jo Enterprises, Inc., Malvern, Pa.

[21] Appl. No.: 654,802

[22] Filed: Sep. 26, 1984

[51] Int. Cl.[4] .............................................. A47J 17/00

[52] U.S. Cl. ....................................... 99/538; 83/437; 83/451; 99/509; 99/537

[58] Field of Search ................. 99/509, 510, 537, 538, 99/567, 542–545; 83/451, 431, 437, 620, 471.2

[56] References Cited

U.S. PATENT DOCUMENTS

| | | | |
|---|---|---|---|
| 1,040,582 | 10/1912 | Royer et al. . | |
| 1,399,950 | 12/1921 | Fish . | |
| 1,825,628 | 9/1931 | Floyd et al. . | |
| 1,825,629 | 9/1931 | Floyd . | |
| 1,943,113 | 1/1934 | Daum . | |
| 2,329,918 | 9/1943 | Leavens . | |
| 2,479,982 | 8/1949 | Stevens . | |
| 2,540,014 | 1/1951 | Smith . | |
| 2,645,262 | 7/1953 | Marasco . | |
| 2,647,549 | 8/1953 | Koch . | |
| 2,852,053 | 9/1958 | Berry et al. . | |
| 3,807,266 | 4/1974 | Camp | 83/404.4 |
| 3,830,151 | 8/1974 | Gerson | 99/537 |
| 4,095,518 | 6/1978 | Jones | 99/538 |
| 4,111,112 | 9/1978 | Altman | 99/538 |

*Primary Examiner*—Timothy F. Simone
*Attorney, Agent, or Firm*—Benasutti and Murray

[57] ABSTRACT

A produce wedger is provided for sectioning produce, such as tomatoes. The produce is restrained in such a manner that as the slicing device moves through it (thereby slicing it into a plurality of sections), the produce is left substantially in its original shape. The device is configured to minimize destruction of the composition of the produce.

A method of sectioning by slicing with minimal disruption of the produce, is disclosed.

10 Claims, 8 Drawing Figures

FIG. 1
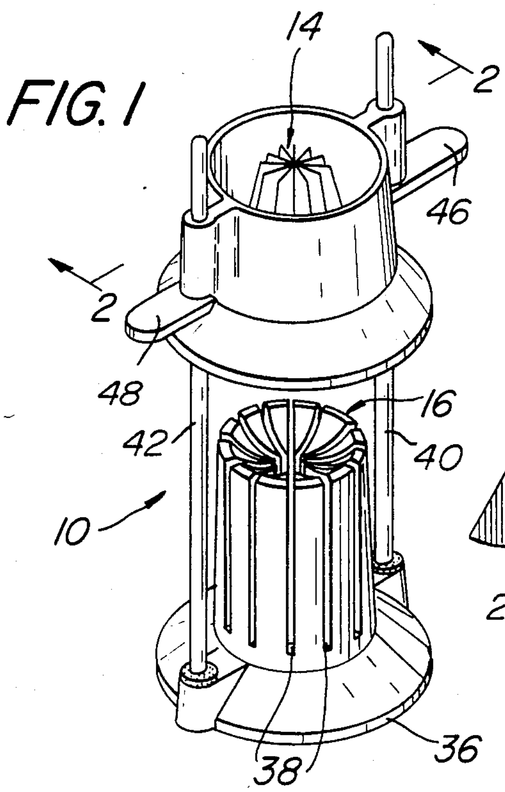
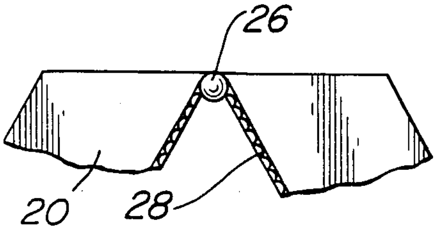
FIG. 6
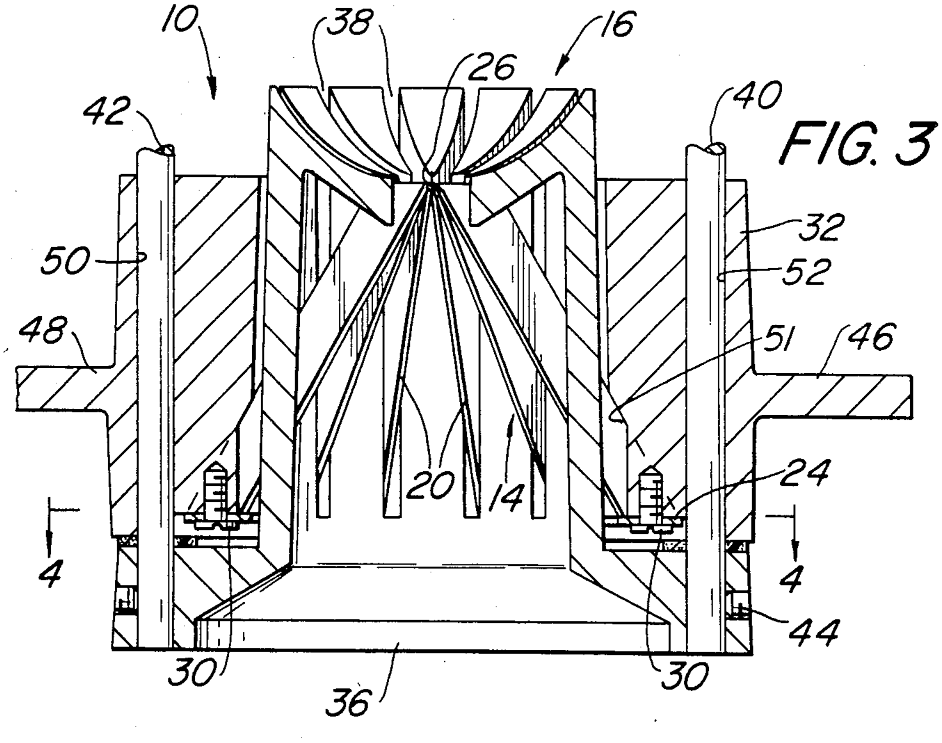
FIG. 3

FIG. 4
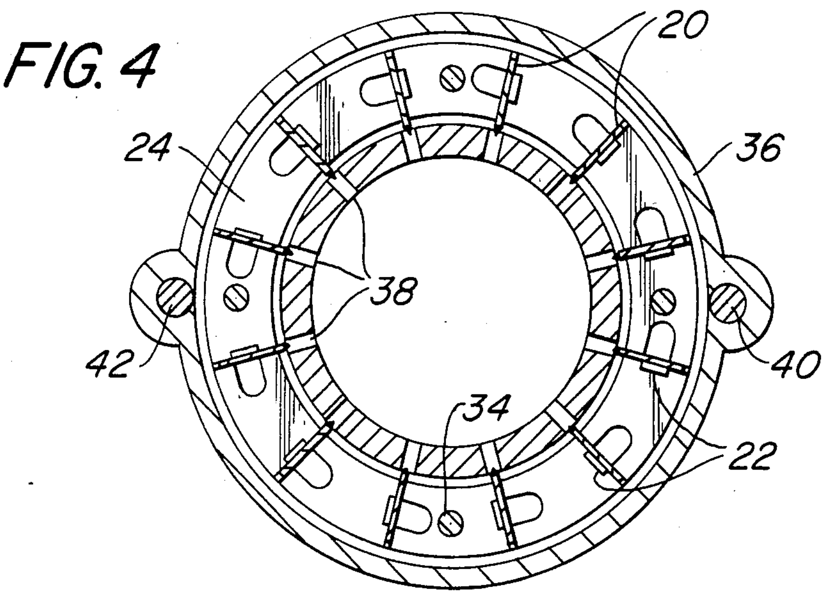
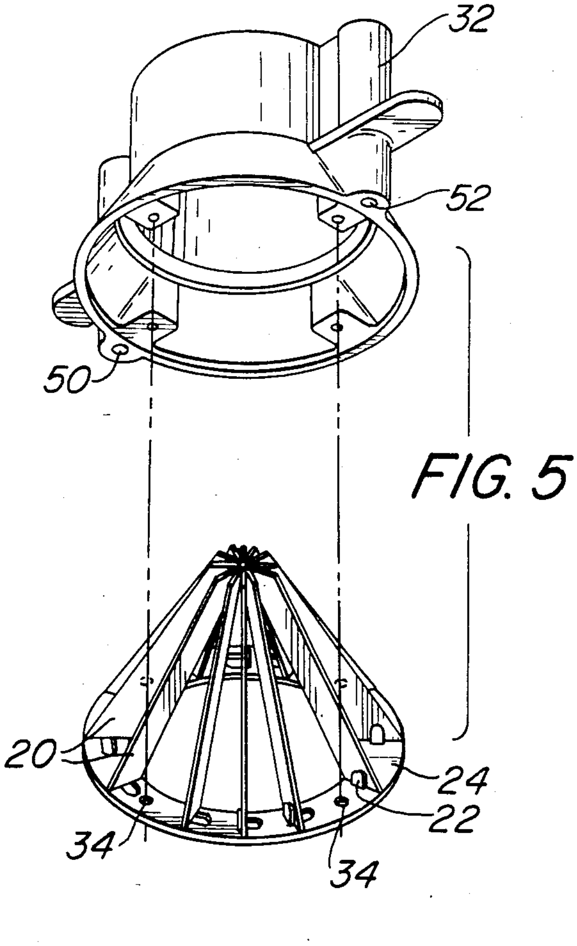
FIG. 5

PRODUCE WEDGER

BACKGROUND OF THE INVENTION

1. Field of the Invention

This invention relates generally to devices for slicing produce, and more specifically, to methods and devices for slicing the produce into wedges or segments.

2. Description of the Prior Art

In the prior art such as that depicted in U.S. Pat. Nos. 3,830,151 and 4,095,518, produce slicers are provided having a fixed and a movable member. The fixed member initially retains the produce and comprises a generally conical arrangement of blades having an apex supporting a pin which penetrates the produce. The movable member engages the produce and forces it through the blades so that the segments thus formed separate and fall through the fixed member to be thereafter collected.

A more elaborate, but similar device is shown in U.S. Pat. No. 4,111,112 which has rotary blades.

We have observed a number of disadvantages in such devices, among which are the following. Such devices are inherently unsafe for the user, since the hand of the user may be disposed between the blades and the activator which is used to engage the produce upon actuation and thus the hands of the user can be forced into engagement with either the pins or the blade.

The pin is also undesirable because it is forced into the produce first, thus displacing and crushing the produce before it is cut into segments. This is particularly undesirable with soft, thin-skinned fruits, such as tomatoes.

In other devices such as those shown in U.S. Pat. Nos. 2,647,549; 1,040,582; 2,329,918; and British Patent Specification No. 379,926 (1932) a conically pointed arrangement of blades is driven point first through the produce thereby initiating cutting at one end and driving the segments of produce apart as the blades pass through the produce.

Furthermore, the convergence or juncture of the blades is a formidable mass which crushes and compresses the produce thereby destroying its consistency. Most undesirable about such an arrangement is the fact that maximum compression is applied at the onset. For produce, such as tomatoes, the compression crushes the fruit and squeezes the juice out of it. The Koch patent, U.S. Pat. No. 2,647,549 even provides a trough 6 for collecting the juice.

In the restaurant industry, it is desirable to prepare segmented produce substantially in advance of its ultimate use by the consumer. Upon cutting produce, it is internally exposed to the air and this to oxidation and odors. It can collect bacteria, as well as change its taste upon storage. If it is held together, however, that process may be substantially inhibited. In these prior art devices, the segments of the produce either fall into uncontrolled disarray or are otherwise forced apart upon actuation of the device, thereby exposing their cut surfaces to the air with the resulting disadvantages just mentioned.

Accordingly, it is an object of the present invention to overcome these and other disadvantages of the prior art.

It is a further object of the present invention to provide additional benefits not recognized in the prior art.

SUMMARY OF THE INVENTION

The present invention comprises a device for sectioning produce, such as tomatoes or other fruits and vegetables. The device has a plurality of blades encased within a movable member. This movable member moves with respect to a fixed member which is configured to restrain the movement of the produce in a free floating fashion until engaged by the blades of the movable member. The movable member is mounted vertically above the fixed member so that gravational forces restrain the movement of the produce within the fixed member. The blades are disposed within the movable member in a conical arrangement most preferably at a thirty-degree angle to the direction of travel of the movable member, for optimum cutting. The apex of the cone is remote from the initial engagement by the blades with the produce. The blades slice through the produce, thereby releasing the compressive forces. The slicing forces are directed toward the center of the produce and tend to maintain the shape of the produce. The blades are joined at their apex with a minimal amount of material and no pin is used to impale the produce.

Accordingly, it is an object of this invention to improve upon the prior art devices by providing a device which sections produce, yet leaves it in substantially the same shape and condition insofar as the relation of the segments to one another is concerned, as it was before it was segmented; thus insuring less exposure to the air and bacteria along the sliced surfaces, and thereby providing fresher storage capability for the produce in its segmented form.

It is another object of this invention to provide the safety features of blades within an enclosed housing, such that the housing engages the hand of the user prior to permitting that hand to come in contact with the blades, thus preventing inadvertent injury to the user.

It is another object of the invention to eliminate the pin of the prior art which was used for impaling the produce and preventing it from moving while being engaged and segmented. This pin created undue displacement in the produce, thereby damaging or crushing the produce at the ends of the segments. Further, the pin could be a source of potential injury to the user in impaling the produce on it or in driving the hand of the user into the pin upon inadvertent actuation of the device with the hand of the user between the moving and fixed parts. Finally, elimination of the pin provides for better centering and more uniform sections of produce.

It is a further object of this invention to provide segmented fruit which has less deformation and crushing and more uniformity and consistency throughout than has previously been possible with the devices of the type described above.

A further object of this invention is to provide a device which has an optimum slicing angle to provide the best possible slicing action without losing blade strength and without experiencing undue flexing of the blades. In this regard, it is an object of this invention to provide such a device which may segment thick or thin skinned produce into as many as twelve pieces.

It is also an object of this invention to provide a device which has a true slicing action from the outside inwardly; as opposed to prior art devices which either shoved the produce through the blades or rammed the blades into the center of the produce for outward cutting.

A further object of our invention is to provide a method of segmenting produce which minimizes compression and destruction of the consistency of the produce, particularly at the ends of the segments.

These and other objects of the invention will become apparent from the following description with references to the accompanying drawings.

BRIEF DESCRIPTION OF THE DRAWINGS

FIG. 1 is a perspective view of a device in accordance with the present invention;

FIG. 3 is a partial section similar to FIG. 2 showing the parts in alternate relation;

FIG. 4 is a section taken as indicated by the lines and arrows 4—4 in FIG. 3;

FIG. 5 is an exploded re-oriented perspective view on a slightly smaller scale of the upper portion of several of the parts of the device depicted in FIGS. 1 and 2;

FIG. 6 is an enlarged view partially broken away, of a portion of the device as identified by the elliptical phantom lined portion designated 6 in FIG. 2;

DESCRIPTION OF THE PREFERRED EMBODIMENTS

Figure 2:
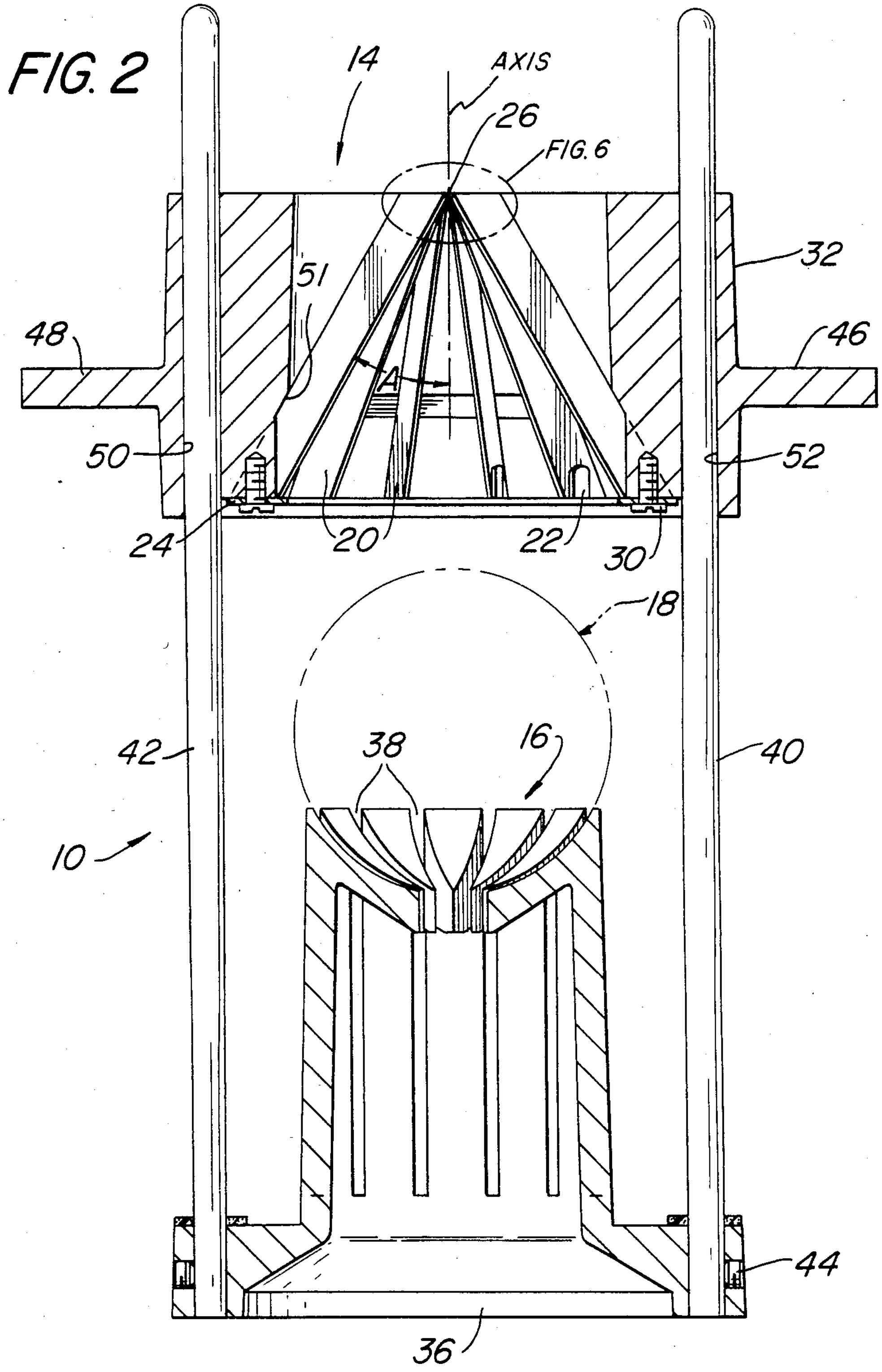
FIG. 2 is an enlarged cross-section of a portion of the device taken as indicated by the lines and arrows 2—2 in FIG. 1, showing diagramatically in phantom lines the position of a piece of produce within the device.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, FIGS. 1 and 2 show a device in accordance with the preferred embodiment of this invention designated generally 10 comprising, a movable means designated generally 12 having a plurality of blades 14 retained therein. The movable portion is arranged for movement with respect to a produce holding means designated generally 16 which is generally configured at its terminal portion closest to the direction of travel of the movable member 12, to be in the shape of the external configuration of the produce. (See for example the phantom lines depicting a spherical piece of produce 18).

The arrangement of blades 20 (FIGS. 2 and 5) is critical to achieving the desired ends of this invention. In particular, the blades are arranged in a conical fashion with the cutting edges facing inwardly. The apex 22 of the cone will be remote from the produce until sometime after the cutting edges have begun slicing the produce.

Furthermore, the arrrangement depicted provides for engagement of the outer periphery of the produce in the following stages, with the following effects. First, the arrangement is such that the blades will tend to center the produce in its complementally configured restraining means. In that regard, the produce is not impaled on any pin or the like and is relatively free floating within the confines of the configured surface which, nevertheless, restrains it for ultimate slicing. The device is thus self centering insofar as the produce is concerned.

Secondly, as more than one blade begins to engage the outer surface of the produce, the forces are first directed inwardly from the blades toward the center of the produce and then the reactive forces of the produce being forced against the complementally configured surface of the fixed member will begin to combine to put an inward pressure on the produce. However, those compressive forces are immediately released upon penetration of the skin. The action of the blades being drawn across the surface of the produce, is a true slicing action (rather than chopping).

Thirdly, as the blades continue to descent vertically, their slicing action continues to be directed toward maintaining the original shape of the produce (rather than separating the wedges being cut).

Next, the apex 22 will engage the uppermost portion of the produce and begin to form the leading edge of a wedge of produce where two sliced surfaces come together. By maintaining that juncture as small as possible (as described in greater detail hereinafter), that leading edge will be kept as fine as possible and the produce will not be subjected to undue crushing.

As slicing continues, the leading edge of the wedge is maintained at substantially the central axis of the produce and, more importantly, the blades in passing through the produce do not separate it to any substantial extent, but allow it to remain in its original condition (save for the cut fibers and pulp which make up the produce). Finally, the apex 22 passes completely through the produce as will be appreciated when viewing FIG. 3. This leaves the sections (as previously stated) in their original overall configuration which, it will be appreciated, means they are in contact along their sliced surface. This eliminates to a substantial degree, contact with air and the debilitating effects of oxygen and odors contained therein.

Another aspect of the action of moving the blades against the retained produce is that the blades slice the produce into wedges from the moment of contact on. In the prior art devices, the produce was either forced onto blades and/or pins which tended to crush, bruise and in part destroy the texture of the produce, or the produce was pierced and separated from the inside out which again has a deleterious effect on a composition of the produce. In sharp contrast, the present invention provides a means of continuously slicing from the instant of contact of the blade with the outside surface of the produce; which action minimizes the crushing effect and provides a better finished product. To optimize this slicing action we have discovered an optimum blade angle of 30° to the axis of travel provides the best results. Accordingly, the blades are arranged at that angle as will be more fully described hereinafter. We have found that angles greater than 30° do not provide the preferred slicing action and angles less than 30° require undue length on the part of the blades which tend to flex and loose blade strength. Referring to FIG. 2, the axis is labeled and the angle A taken between the axis and the edge of the blade whose flat surface lays in the plane of the paper, is most preferably 30°. To retain these blades, each one is tack welded to a upstanding tab such as at 22, FIG. 5 extending upwardly from a ring 24. The other ends of the blades are welded together as more fully described in our co-pending application for a blade assembly. Suffice it to say for present purposes that the blades are welded at the juncture of the blades to a small metallic ball 26, FIG. 6. This minimizes the displacement of the produce caused by the juncture of the blades by minimizing the mass of that juncture. There is less frontal area at the convergence of the blades and therefore, less displacement of the produce. In the prior art devices of which we are aware, the displacement was much greater than that in our invention, depending on the method of joining the blades and the resulting blade assembly. As previously pointed out, this often included a pin which further increased the displacement of the produce upon passing of the blades therethrough.

We have found that the cutting action of the blades can be further enhanced by providing a coarse honed edge (illustrated by the scalloped configuration 28 in FIG. 6) rather than a smooth edge, as is the present industry standard.

The blades are preferably equally spaced from one another about the ring 24. We have found that this configuration and arrangement allows us to section produce in twelve wedges (see FIG. 4) which, insofar as we know, exceeds any available cutter on the market. Of course, the number of wedges can be changed by removing the blade assembly and replacing it with one having for example, less blades. Removal is easily obtained by removing the screws 30 in FIG. 3 from the housing 32. The screws 30 pass through the holes 34 in the ring 24. In going from say twelve blades to six blades, the same base 36 would be used, since the spacing of the slots 38 would remain the same, but there would only be sufficient blades to accommodate every other slot (FIG. 4).

The blades are further stabalized by abutting the backs of the bladed against the conical surface 51 the housing 32 as shown in FIG. 3.

The housing 32 of the movable means 12 travels on two upstanding rods 40, 42 which are fastened in the base 36 by any suitable means such as the set screws 44. Laterally extending ears 46, 48 provide a means for raising and lowering movable means 12 with respect to the produce and the base 36. These are most preferably cast integrally with the housing 32.

The housing has bores 50, 52 FIG. 5 to accommodate the rods 40, 42 in close sliding engagement; each of the bores providing a bearing surface extending through the length of the housing in the axial direction to minimize wobble.

Figures 7, 8:
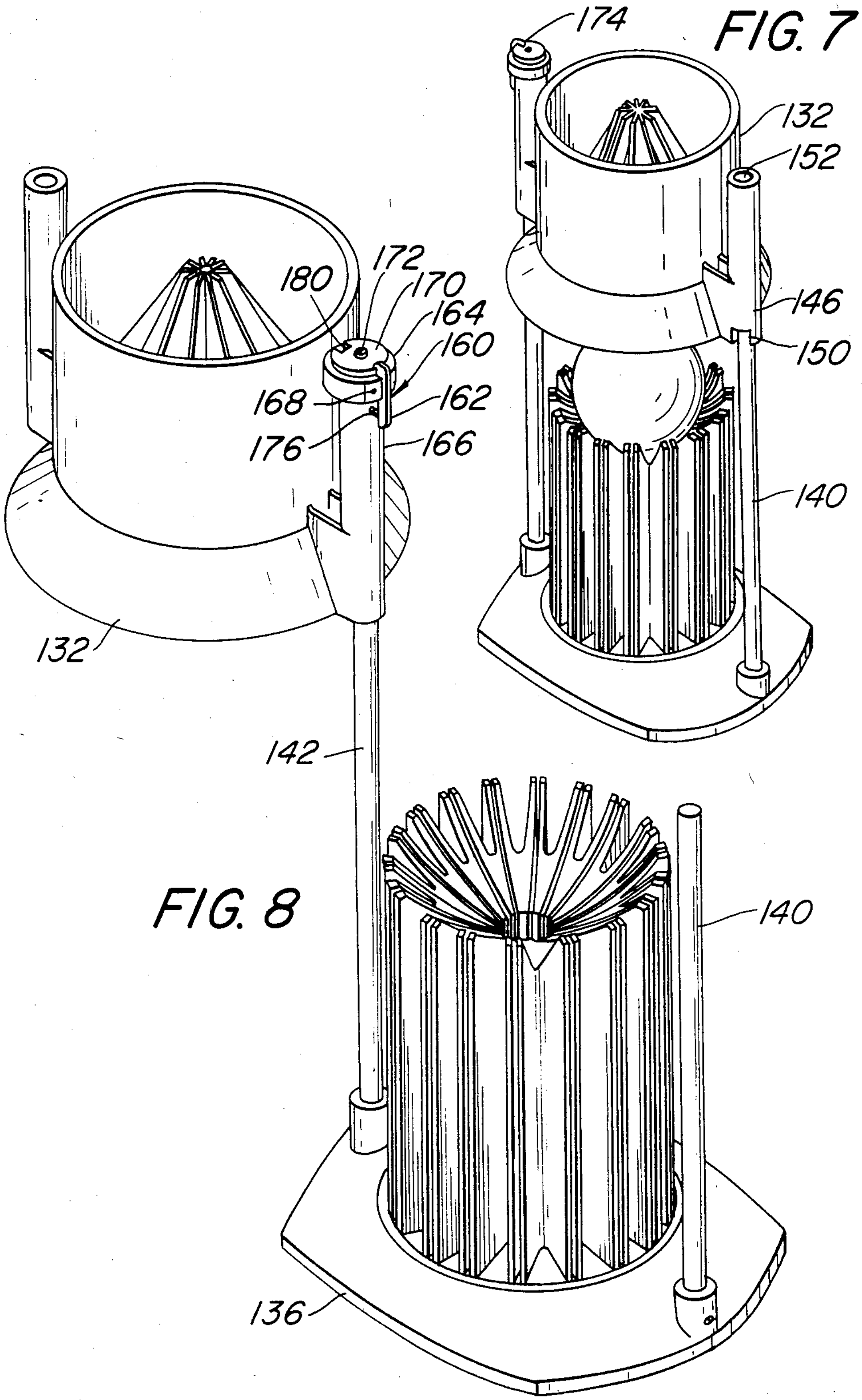
FIG. 7 is a perspective view of an alternate embodiment of the present invention showing diagramatically a piece of produce positioned in the device.
FIG. 8 is an enlarged perspective view of the device shown in FIG. 7 showing the parts oriented in a different relation than that shown in FIG. 7.

As shown in FIG. 3, the blade assembly 14 is dimensioned so that the juncture of the blades at 26 passes completely through the produce at the end of its travel. That point is perhaps 1/16 to ⅛ inch below the level of the produce retained in the cup-shaped portion of the base. The produce is sliced to that point, thus minimizing destruction of the composition of the produce. It also allows for easy removal of the sliced produce in its retained shape. An alternate embodiment of our invention is shown in FIGS. 7 and 8. In this embodiment the housing can be swung away from the base to provide greater access to the base. This is accomplished in the following manner. First, the rods are of different lengths (see FIG. 8). The housing 132 can be swung counterclockwise about the rod 142 from the position shown in FIG. 7 to the position shown in FIG. 8 thereby exposing the base 136. After produce has been placed on the base, that housing may be returned in a clockwise direction about the rod 142 until the ear 146 engages the rod 140. To provide for this action a slot 150 is formed in the leading face of the ear 146 (when viewed in the direction of approach to the rod 140). This permits entry of the rod 140 into the ear 146 until it engages the surface forming the bore 152.

The spring loaded latch mechanism designated generally 160, comprises a beaked latch 162 pivotally mounted to a ring 164, fixedly attached to the top of the ear 166 by any suitable means such as the set screw 168.

A notched disc 170 is fixedly attached to the top of the rod 142 by the bolt 172. The outwardly extending beak 174 of the latch 162 rests on the upper surface of the disc 170 to prevent the housing 132 from moving vertically downwardly as shown in the disposition of the parts in FIG. 8. The beak is urged into this position by the spring 176.

When the parts are rotated to the position shown in FIG. 7, the latch may be disengaged from the disc 170 by pushing it against the spring and rotating it about its pivot so that the beak moves outwardly away from the axis of the rod 142. The beak is dimensioned such that in its outwardmost position, it will pass through the slot 180 which extends vertically downwardly through the disc 170. Since only the beak retains the housing 132 in its uppermost position, releasing of the beak so that it passes through the slot 180 has the effect of releasing the housing so that it may descend on the rods 142, 140 and engage the produce in the manner previously described.

It will be understood that various changes in the details, materials and arrangement of parts which have been herein described and illustrated in order to explain the nature of this invention may be made by those skilled in the art within the principle and scope of the invention as expressed in the following claims.

We claim:

1. In a device for sectioning produce, said device having a plurality of blades, the improvement comprising:

(a) means for holding the produce;

(b) movable means for engaging said produce to force it against said holding means and slice it into sections; said plurality of blades being arranged in said movable means to engage when in operation the outer surface of said produce at a plurality of surface locations and slice the produce toward its center;

(c) means for joining said blades to minimize the mass of the juncture of the blades; said blades joined in a configuration such that in their passage during operation through said produce the juncture of said blades will not substantially compress, displace and destroy the composition of said produce; and (d) said movable means, said holding means and said blades having a configuration and juxtaposition with one another such that during operation thereof said produce retains its overall shape during sectioning and the sections are not substantially separated by the action of the movable means and the blades, with the juncture of the blades engaging the produce only after slicing occurs at a plurality of surface locations.

2. The invention of claim 1 wherein said blades are disposed at an angle of approximately 30° to the axis of travel of the movable means with respect to said produce.

3. The invention of claim 2 wherein said blades have rough honed cutting edges.

4. The invention of claim 1 wherein the holding means and movable means are configured and disposed with respect to one another such that the produce is freely movable within the confines of the holding means prior to engagement of the movable means, and said movable means acts upon said produce on initial engagement therewith to move said produce to a central location for substantially uniform segmenting.

5. The invention of claim 1 wherein said plurality of blades comprises twelve blades equally spaced in a conical configuration, the apex of which forms said juncture most remote from the produce in the direction of travel of the movable means.

6. The invention of claim 1 wherein the plurality of blades are retained in the movable means in a conical configuration with their ends remote from the apex of said cone fixed to a ring; said blades extending from said ring into a void in said movable means; said blades having inwardly facing cutting edges and being supported on their outward edges between the apex and their fixed connection with said ring, against a portion of the movable means.

7. The invention of claim 1 wherein means are provided to regulate the travel of the movable means with respect to the produce holding means, comprising:

(a) a pair of rods; and (b) bearing surfaces longitudinally extending through said movable means and engaging said rods to control the movement of said movable means thereon.

8. The invention of claim 7 wherein latching means are provided associated with said movable means and said rods to permit said movable means to rotate about one of said rods.

9. The invention of claim 8 wherein said latching means comprises:

(a) means in the first position to permit axial movement of said movable means along said rods when said movable means is in engagement with both of said rods;

(b) means to prevent axial movement in the aforesaid position; and (c) means to prevent axial movement when said movable means has been rotated to a position where it engages only one of said rods.

10. The invention of claim 9 wherein said latching means comprises a spring biased pivotal latch having a beak engaging an upper portion of said rod, said upper portion having a slot therein permitting passage of said beak axially upon depressing the latch and pivoting it against the spring.

* * * * *

US004569280B1

REEXAMINATION CERTIFICATE (2933rd)

United States Patent [19]

[11] B1 4,569,280

D'Ambro et al.

[45] Certificate Issued Jul. 2, 1996

[54] PRODUCE WEDGER

[75] Inventors: Dominic D'Ambro; Clayton E. Giangiulio, both of Malvern, Pa.

[73] Assignee: Le-Jo Enterprises, Inc., Malvern, Pa.

Reexamination Request:
No. 90/003,950, Aug. 21, 1995

Reexamination Certificate for:

| | |
|---|---|
| Patent No.: | **4,569,280** |
| Issued: | **Feb. 11, 1986** |
| Appl. No.: | **654,802** |
| Filed: | **Sep. 26, 1984** |

[51] Int. Cl.$^6$ .............. A47J 17/00

[52] U.S. Cl. .............. 99/538; 83/437; 83/451; 99/509; 99/537

[58] Field of Search .............. 99/537, 538, 509, 99/510, 567, 542–545; 83/431, 451, 437, 620, 471.2

[56] References Cited

U.S. PATENT DOCUMENTS

| | | | |
|---|---|---|---|
| 2,852,053 | 9/1958 | Berry et al. | 146/169 |
| 4,095,518 | 6/1978 | Jones | 99/538 |

FOREIGN PATENT DOCUMENTS

| | | |
|---|---|---|
| 52415 | 6/1890 | Germany . |
| 2807739 | 5/1980 | Germany . |
| 379926 | 9/1932 | United Kingdom . |

*Primary Examiner*—Timothy F. Simone

[57] ABSTRACT

A produce wedger is provided for sectioning produce, such as tomatoes. The produce is restrained in such a manner that as the slicing device moves through it (thereby slicing it into a plurality of sections), the produce is left substantially in its original shape. The device is configured to minimize destruction of the composition of the produce.

A method of sectioning by slicing with minimal disruption of the produce, is disclosed.

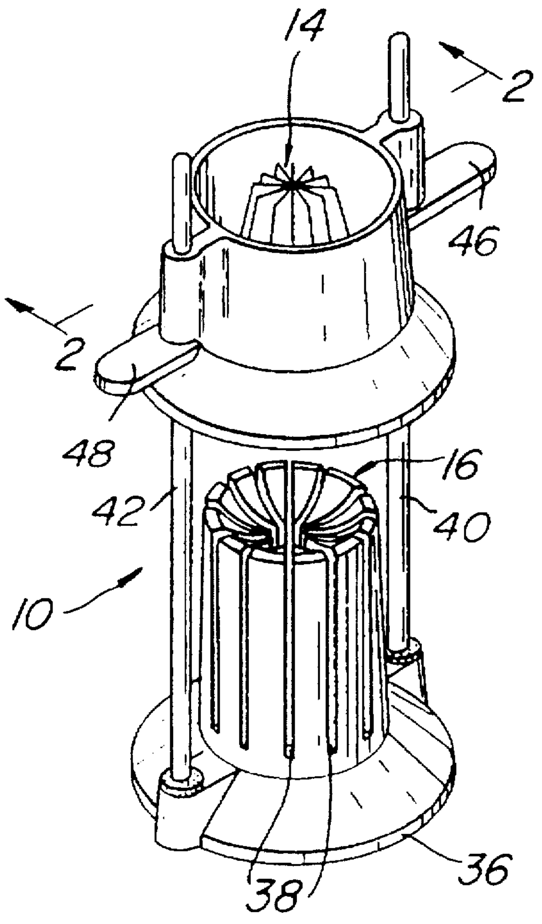

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *